United States Patent [19]
Truong

[11] Patent Number: 5,799,488
[45] Date of Patent: Sep. 1, 1998

[54] NURTURING TREELETS

[76] Inventor: Mac Truong, 325 Broadway, New York, N.Y. 10007

[21] Appl. No.: 505,446

[22] Filed: Jul. 21, 1995

Related U.S. Application Data

[63] Continuation of Ser. No. 461,760, Jan. 8, 1990, abandoned.
[51] Int. Cl.$^6$ .................................................. A01G 13/00
[52] U.S. Cl. ............................................ 47/101; 47/58; 27/1
[58] Field of Search ............................... 27/1; 52/104, 103; 47/1.01, 58, 58.01, 74, 24, 79 R, 48.5

[56] References Cited

U.S. PATENT DOCUMENTS

| | | | |
|---|---|---|---|
| 465,219 | 12/1891 | Staley | 47/79 R |
| 667,467 | 2/1901 | Sherman | 47/48.5 X |
| 748,284 | 12/1903 | Karwowski | 52/104 |
| 2,191,808 | 2/1940 | Schramm | 47/24 |
| 2,931,140 | 4/1960 | Laffler | 47/48.5 X |
| 3,732,602 | 5/1973 | Vigh | 27/1 |
| 3,837,301 | 9/1974 | Falling | 27/1 |
| 4,776,130 | 10/1988 | West | 47/48.5 X |
| 4,780,994 | 11/1988 | Chen | 47/48.5 X |
| 4,977,652 | 12/1990 | Graham | 47/1.01 |

FOREIGN PATENT DOCUMENTS

| | | | |
|---|---|---|---|
| 2483223 | 12/1981 | France | 27/1 |
| 683201 | 1/1994 | Switzerland | 47/DIG. 10 |

OTHER PUBLICATIONS

Proceedings of the North American Containerized Forest Tree Seedling Symposium Aug. 26–29, 1974.

*Primary Examiner*—Terry Lee Melius
*Assistant Examiner*—Joanne C. Downs
*Attorney, Agent, or Firm*—John R. Ewbank

[57] ABSTRACT

An area scheduled for visiting by persons desiring to pay homage to a deceased human features a group of identified trees, each planted to be an embodiment of the ongoing life of a particular human who has died. A precursor of a tree, such as a seed or a seedling, is planted in a nutrient composition featuring the dirt-like material, preferably ashes, derived from the remains of said deceased human. The Treelets are nurtured during a period of significant growth in the said nutrient composition.

3 Claims, 1 Drawing Sheet

FIG. 1
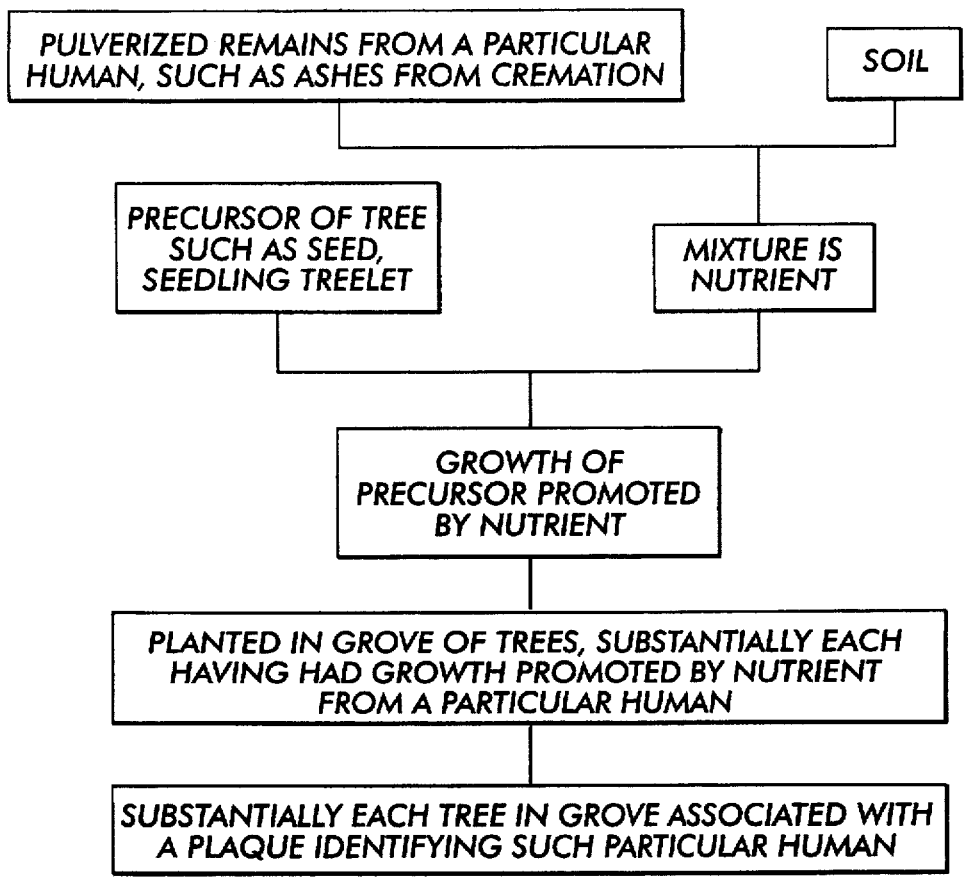
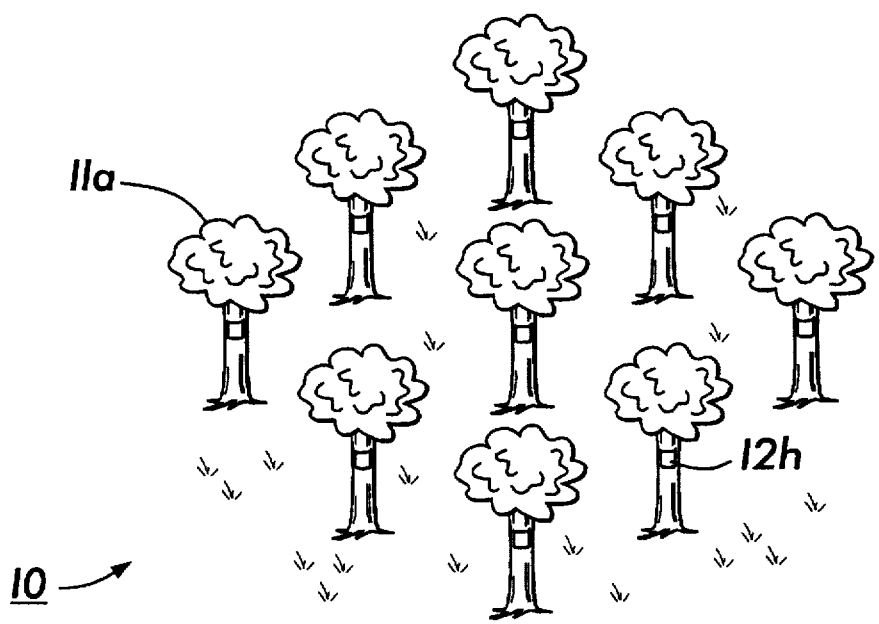
FIG. 2

NURTURING TREELETS

This application is a continuation of application Ser. No. 07/461,760, filed Jan. 8, 1990, now abandoned.

BACKGROUND

1. Field of Invention

This invention relates to methods for educating humans to appreciate that there is ongoing life notwithstanding the death of a particular human. This invention relates to methods for alleviating the grief occurring upon the death of a loved one. This invention relates to methods for educating humans to cherish the total environment for preservation of Mother Earth for future generations. This invention relates to the nurturing of precursors for trees by controlling the composition of the nutrient of precursors for trees by controlling the composition of the nutrient composition in which a seed or seedling will undergo significant growth for becoming a treelet. This invention relates to methods for rendering trees and plants much more valuable and attractive to human beings from both emotional and commercial viewpoints. This invention relates to methods for recycling and disposing of human dead bodies in a more effective, respectful, and productive manner. This invention relates to methods for creating a link between a particular deceased human and a particular tree.

For more than a million years, humans have been fascinated with the planting of seeds for trees and the nurturing of seedlings for more satisfactory growth during the transformation into viable trees. The mortality rate of seedlings, and the poor germination rates of nuts and other seeds capable of maturing into trees has been a challenging problem for many generations. Even before the invention of any written language, humans had developed significant skills concerning tree farming, tree nurseries, and the special nurturing of seeds and seedlings through their early stages of growth.

For more than a million years, humans have been fascinated by the beauty of trees and plants. Humans have always tried to make trees and plants as beautiful and as valuable as possible for both sentimental and commercial purposes. Methods for making trees and plants more beautiful, more attractive, or in brief more commercially valuable have been invented and practiced. New and better methods are yet to be found.

For possibly more than ten million years, humans have had traumatic problems in coping with the grief attributable to the death of a loved relative. Actually no existing method known has sufficiently appeased the said pain and grief. New methods are yet to be invented.

For possibly more than ten million years, humans have had traumatic problems in coping with the problems attributable to the disposal of the corpses of the loved ones who died. In our time the said problem is growing especially in large and crowded cities. Some methods for disposing of dead bodies have been invented but every existing method has its shortcomings. None of the existing methods would satisfy both the family of the decedent and the community as a whole. None of the existing methods would contribute to the preservation of the earth and life in general. New methods for satisfactorily disposing of and recycling dead human bodies are needed and must be invented.

In some areas in which carrion birds such as vultures have been abundant, it has been the custom for the corpse to be made available for vultures and the like. In other areas, a human corpse has been buried under conditions favoring biological deterioration such that none of the remains of the corpse are conspicuous within a few centuries. The remains of most human ancestors cannot be identified.

Wealthy families concerned with making an ostentatious display of their wealth have erected tombstones in cemeteries where corpses were buried, sometimes in concrete vaults protecting the corpse from contact with soil microorganisms for centuries. The Taj Mahal and other memorials have been built to commemorate the lives of particular individuals. In fund-raising campaigns, survivors have named deceased individuals in whose memory funds were given for memorializing such decedents on a plaque identified with a church window, tree, dormitory, library, etc.

Tombstones, church windows, and other memorials provide evidence of an ongoing search by survivors for visible reminders that a deceased person was appreciated and loved when living. The ongoing experimentation has demonstrated that the long standing demand for such services has not been satisfactorily met.

Facts show that human civilization and the growth of trees and plants go in opposite direction. The more human societies develop, the more trees and plants are destroyed. In recent years humans are more aware of the crucial importance of trees for life on earth. If we do not stop the destruction of forests, we shall all perish one day. However, new methods are yet to be invented to create a sense of respect and a strong feeling to preserve trees and plants for the benefit of humankind and all other living organisms on this planet.

SUMMARY OF THE INVENTION

In accordance with the present invention, a grove characterized by more than one tree, substantially each tree or plant is grown from a seed or seedling in a nutrient composition featuring the dirt-like material, preferably ashes, derived from the remains of a deceased human, such tree or plant being identified as embodying the ongoing life of such deceased human.

DRAWING

In the accompanying drawing, FIG. 1 is a flowsheet, and FIG. 2 is a perpective view of a grove of trees, each having a plaque identifying the deceased human whose unique remains fertilized such unique tree.

In FIG. 1, the flowsheet shows the several steps of preparing a memorial grove.

In FIG. 2, a memorial forest features a grove 10 of trees, substantially each tree 11 having a plaque 12 identifying the particular human whose unique remains fertilized such unique tree.

DESCRIPTION OF PREFERRED EMBODIMENTS

EXAMPLE 1

After the death of a man, his corpse is cremated, and the ashes are collected. A nutrient composition is prepared consisting of said collected ashes and damp soil, and such nutrient composition is placed in a nursery pot.

In order for the seed to germinate, for the seedling to grow into a treelet, for the treelet to grow into a young tree, and for the young tree to grow into a mature tree, a variety of nurturing conditions must be provided. For example, water should be provided throughout appropriate stages of the growth. Trees require sunlight, carbon dioxide in the atmosphere and other desiderata. Different nutrient compositions may be advantageous for different trees. All of the specialized knowledge concerning appropriate techniques, compositions, methods, etc. past, present and future concerning the growing of trees can be utilized when practicing the present invention, which is concerned with the improvement of incorporating in the nutrient composition some dirt-like material, preferably ashes, derived from the remains of a particular human corpse.

In this example, a selected seed from a plum tree is planted in such nutrient composition and nurtured carefully to enhance the likelihood of germination of the seed and growth of the seedling into a plum tree. If there is failure to germinate and/or grow satisfactorily, the same nutrient composition, enriched by the products from the previous attempt, would be used for another seed until a viable tree was assured. Such procedure, constantly aiming at creating a unique link between a deceased human and a particular grown tree, differs significantly from traditional production of the maximized number of viable trees with minimized human labor and minimized costs. Such tree comprising components derived uniquely from the remains from a particular deceased human is identified by a plaque commemorating such particular deceased human in a grove of trees.

EXAMPLE 2

The ashes from the cremation of a deceased woman are mixed with soil so that the resulting nutrient composition contains approximately 25% ashes and 75% soil. A black walnut is planted in such mixture, leading to the growth of a black walnut tree. The residue from said nutrient composition continues to nurture the tree because such residue accompanies the roots during whatever transplanting occur. A significant portion of the ashes are transformed into the black walnut tree.

The invention can be described as a memorial forest featuring predominantly trees prepared in accordance with the present invention to embody the ongoing lives of deceased people. In a memorial grove of the present invention, substantially all of the trees are associated with an appropriate notice (e.g. a plaque) identifying the deceased person embodied in a particular tree.

EXAMPLE 3

The nutrient composition should have an appropriate proportion of the dirt-like material derived from the human corpse relative to the total nutrient Some seedlings have sufficient vitality to thrive in a mostly nutrient composition consisting of human ashes or human dirt-like material, plant hormones, fertilizers and modifiers, without added soil. For those national patent systems having requirements for numerical limits in order to comply with standards of definiteness, numerical limits are set forth to illustrate that a predominant portion of soil-containing nutrient composition may contain at least 1% by weight but not more than 99% of each of said two components, the dirt-like material derived from a particular human corpse and soil.

It is the careful and intentional addition of the available dirt-like material, preferably ashes, derived from the bodily remains of a particular deceased to the nutrient composition prepared for the germination and/or growth of the precursor of a particular tree, which particularly characterizes this feature of the present invention. A tree whose growth has been promoted by the remains of a particular human is in a grove of trees in a memorial grove in which substantially each of the trees is associated with a plaque identifying the particular human whose remains promoted the growth of a precursor for such tree.

Heretofore various pesticides, plant hormones, and similarly biologically pertinent components have been employed in the soil in which tree seeds or seedlings have been nurtured into treelets. Similarly glass beads, pebbles, and the like have been employed to stimulate appropriate branching and bending of the growing roots. All such modifiers of past present and future technology can be included in the nutrient composition of the present invention.

Many variations and modification of the invention are possible, and the illustrative examples are merely illustrative of the invention. It is only in the claims, susceptible to amendment during prosecution, that there has been an attempt to limit the scope of the invention.

The invention claimed is:

1. The method of preparing a grove characterized by more than one tree, substantially each tree having been grown in a nutrient composition comprising the remains of a particular human, a significant portion of such trees having identifications associating a particular tree with a particular deceased human, each such tree having been prepared by a method which comprises the steps of:

(a) producing isolated dirt-like material from the remains of said particular deceased human:

(b) preparing a nutrient composition characterized by the incorporation therein of said dirt-like material derived from the remains of said particular deceased human the concentration of the dirt-like material derived from the remains of said particular deceased human constituting from 1% to 99% of the nutrient composition;

(c) planting a precursor of a tree in said nutrient composition;

(d) nurturing said precursor rooted in said nutrient composition for growth transformation into a tree, whereby whatever growth is attributable to the remains of deceased humans is significantly attributable only to said particular deceased human; and (e) providing a plaque identifying such tree as an embodiment of the ongoing life of said particular deceased human.

2. The method of claim 1 in which the precursor is a seed.

3. The method of claim 1 in which the precursor is a seedling.

* * * * *